US012645965B2

(12) United States Patent
Kissell

(10) Patent No.: US 12,645,965 B2
(45) Date of Patent: Jun. 2, 2026

(54) QUBIT SURFACE ALLOCATION SYSTEM

(71) Applicant: Google LLC, Mountain View, CA (US)

(72) Inventor: Kevin Douglas Kissell, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 607 days.

(21) Appl. No.: 18/144,678

(22) Filed: May 8, 2023

(65) Prior Publication Data

US 2024/0378475 A1     Nov. 14, 2024

(51) Int. Cl.
*G06N 10/20* (2022.01)
*G06N 10/40* (2022.01)
*G06N 10/80* (2022.01)

(52) U.S. Cl.
CPC ............. *G06N 10/20* (2022.01); *G06N 10/40* (2022.01); *G06N 10/80* (2022.01)

(58) Field of Classification Search
CPC ......... G06N 10/20; G06N 10/40; G06N 10/80
See application file for complete search history.

(56) References Cited

U.S. PATENT DOCUMENTS

| | | | |
|---|---|---|---|
| 2019/0042970 A1* | 2/2019 | Zou ....................... | G06F 9/3877 |
| 2022/0383179 A1* | 12/2022 | Maksymov ............ | G06N 10/60 |
| 2023/0102347 A1 | 3/2023 | Gutierrez et al. | |
| 2023/0153672 A1* | 5/2023 | Resch ................... | G06F 9/5061 |
| | | | 706/62 |
| 2024/0193451 A1* | 6/2024 | Matsuura ............... | G06N 10/20 |

FOREIGN PATENT DOCUMENTS

| | | |
|---|---|---|
| CN | 115756780 | 3/2023 |
| WO | WO 2020081805 | 4/2020 |

OTHER PUBLICATIONS

Zhang et al. "A depth-aware swap insertion scheme for the qbit mapping problem" (Year: 2020).*
International Preliminary Report on Patentability in International Appln. No. PCT/US2024/028343, mailed on Nov. 20, 2025, 10 pages.

(Continued)

*Primary Examiner* — Omar F Fernandez Rivas
(74) *Attorney, Agent, or Firm* — Fish & Richardson P.C.

(57)     ABSTRACT

Methods, systems, and apparatus for qubit surface allocation. In one aspect, a method includes receiving a request to perform a quantum computation; compiling the request to obtain a program for the quantum computation, wherein the program specifies a first qubit surface required to perform the quantum computation; mapping, based on a quantum processor type and an operational state of an available quantum processor, the first qubit surface to a plurality of physical qubits included in the available quantum processor to obtain a mapped qubit surface; transforming the program to generate a transformed program, comprising replacing quantum computing operations on the first qubit surface with quantum computing operations on the mapped qubit surface; and providing the transformed program to the available quantum processor to perform the quantum computation using the plurality of physical qubits in the mapped qubit surface.

20 Claims, 6 Drawing Sheets

400

(56)　　　　　　　References Cited

OTHER PUBLICATIONS

Standards.ieee.org [online], "P3120: Standard for Quantum Computing Architecture" Feb. 2022, retrieved on May 8, 2023, retrieved from URL <https://standards.ieee.org/ieee/3120/10751/>, 5 pages.

International Search Report and Written Opinion in International Appln. No. PCT/US2024/028343, mailed on Jul. 25, 2025, 14 pages.

Wu et al., "Mapping Surface Code to Superconducting Quantum Processors" quant-ph, Submitted on Nov. 2021, arXiv:2111.13729v1, 14 pages.

* cited by examiner

*320*

4x4 qubit surface <u>322</u>

<u>324</u>

<u>326</u>

*330*

16x1 qubit surface <u>332</u>

<u>326</u>

<u>334</u>

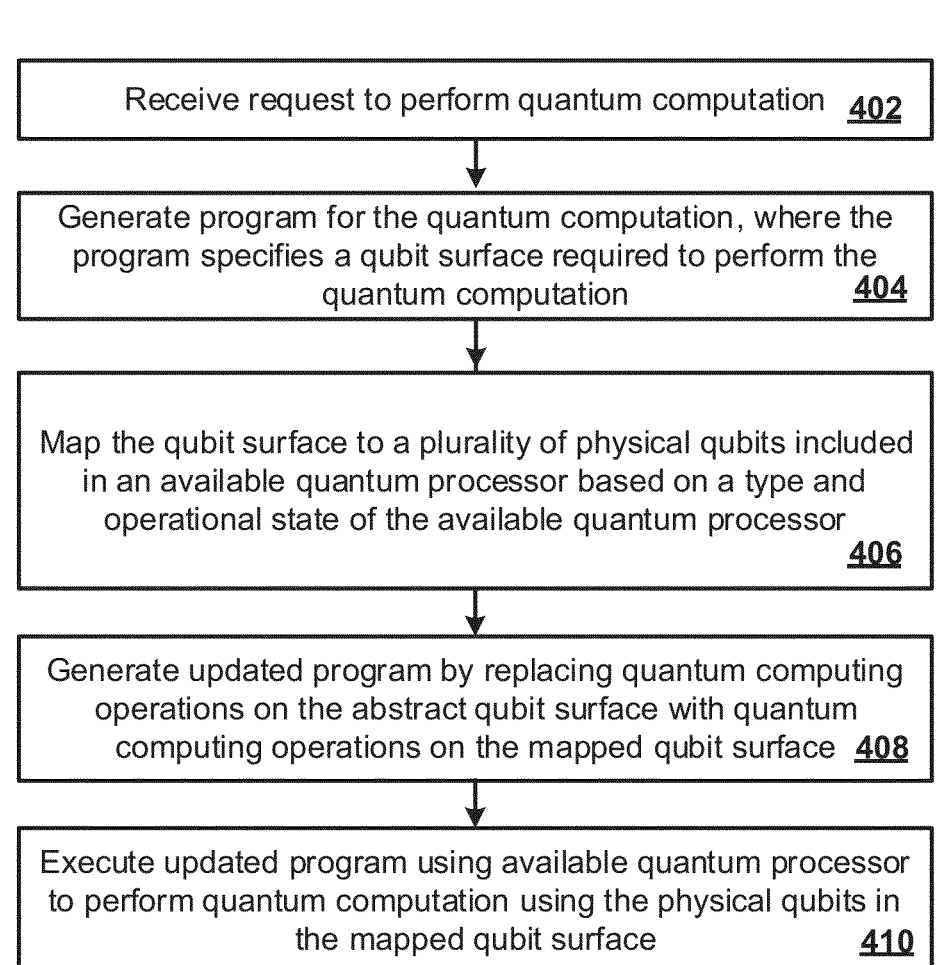

400

Receive request to perform quantum computation   402

Generate program for the quantum computation, where the program specifies a qubit surface required to perform the quantum computation     404

Map the qubit surface to a plurality of physical qubits included in an available quantum processor based on a type and operational state of the available quantum processor     406

Generate updated program by replacing quantum computing operations on the abstract qubit surface with quantum computing operations on the mapped qubit surface   408

Execute updated program using available quantum processor to perform quantum computation using the physical qubits in the mapped qubit surface     410

FIG. 4

QUBIT SURFACE ALLOCATION SYSTEM

BACKGROUND

This specification relates to quantum computing.

SUMMARY

This specification describes a system for allocating quantum processor qubit surfaces to requests to perform quantum computations.

In general, one innovative aspect of the subject matter described in this specification can be implemented in a method that includes receiving a request to perform a quantum computation; compiling the request to obtain a program for the quantum computation, wherein the program specifies a first qubit surface required to perform the quantum computation and quantum computational operations required to perform the quantum computation in terms of the first qubit surface; mapping, based on a quantum processor type and an operational state of an available quantum processor, the first qubit surface to a plurality of physical qubits included in the available quantum processor to obtain a mapped qubit surface; transforming the program to generate a transformed program, wherein transforming the program comprises replacing quantum computing operations on the first qubit surface with quantum computing operations on the mapped qubit surface; and providing the transformed program to the available quantum processor to perform the quantum computation using the plurality of physical qubits in the mapped qubit surface.

Other implementations of these aspects include corresponding computer systems, apparatus, and computer programs recorded on one or more computer storage devices, each configured to perform the actions of the methods. A system of one or more classical and/or quantum computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the first qubit surface comprises a geometry that specifies a number of qubits required to perform the quantum computation and a type of qubit connectivity required to perform the quantum computation.

In some implementations mapping the first qubit surface to a plurality of physical qubits included in the available quantum processor to obtain the mapped qubit surface comprises: querying an operational state of at least one quantum processor of one or more quantum processors, wherein each quantum processor in the one or more quantum processors has a respective quantum processor type; and selecting, based on the operational state of the at least one quantum processor, the available quantum processor from the one or more quantum processors.

In some implementations the operational state of the available quantum processor indicates one or more of: whether qubits included in the quantum processor are currently performing a quantum computation, whether qubits included in the quantum processor are currently idle, whether qubits included in the quantum processor are currently being calibrated, and whether the qubits are out of specification or otherwise not usable.

In some implementations the quantum processor type comprises an ion trap processor, a superconducting processor, a photonic processor, or a neutral atom processor.

In some implementations mapping the first qubit surface to the plurality of physical qubits included in the available quantum processor to obtain the mapped qubit surface comprises selecting a plurality of physical qubits included in the available quantum processor with a geometry that matches a geometry of the first qubit surface.

In some implementations mapping the first qubit surface to the plurality of physical qubits included in the available quantum processor to obtain the mapped qubit surface comprises selecting multiple physical qubits in the available quantum processor so that the selected multiple physical qubits have a geometry that is topologically equivalent to a geometry of the first qubit surface.

In some implementations mapping the first qubit surface to the plurality of physical qubits included in the available quantum processor to obtain the mapped qubit surface comprise selecting an available set of qubits included in the quantum processor; and adjusting control operations included in the program to match constraints and characteristics of the available plurality of qubits.

In some implementations the request to perform a quantum computation specifies one or more performance targets, the performance targets comprising a maximum acceptable computational runtime, a minimum required computational accuracy or error tolerance threshold, or a maximum acceptable cost; and mapping the qubit surface to the plurality of physical qubits included in the available quantum processor to obtain the mapped qubit surface comprises selecting a set of physical qubits included in the available quantum processor that, when used to perform the quantum computation, meet the one or more performance targets.

In some implementations the first qubit surface specifies multiple logical qubits; and the mapped qubit surface comprises multiple pluralities of physical qubits, each plurality of the multiple pluralities corresponding to a respective logical qubit of the first qubit surface.

In some implementations the multiple pluralities of physical qubits comprise disjoint pluralities of physical qubits, and wherein the transformed program comprises lattice surgery operations that enable interactions between the disjoint pluralities of physical qubits.

In some implementations generating the transformed program comprises replacing relative qubit grid addresses in the program with addresses of qubits in the mapped qubit surface.

In some implementations replacing relative qubit grid addresses in the program with addresses of qubits in the mapped qubit surface comprises mapping an origin qubit in the mapped qubit surface to a qubit in the qubit surface with a relative grid address 0,0.

The subject matter described in this specification can be implemented in particular ways so as to realize one or more of the following advantages.

The present disclosure describes an abstraction of a qubit surface, e.g., for the purposes of algorithmic software an N×M cartesian grid of qubits, where multi-qubit gates operate across neighbors on one of the grid axes. The range of X and Y coordinates for a qubit surface can be expressed as values between 0 and N−1 or M−1. In addition to allowing normalized qubit addressing at the lowest levels of quantum software, a qubit surface can have an associated service level in terms of relative coherence and gate times, and gate fidelity.

A system implementing the presently described techniques can achieve increased program reliability, programmer productivity, and operational velocity as well as improve quantum processor utilization. In addition, the presently described techniques can enable the more efficient provisioning of quantum computing services in a cloud computing environment.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is a flow diagram of an example process for allocating a qubit surface to a quantum computation.

Like reference numbers and designations in the various drawings indicate like elements.

DETAILED DESCRIPTION

Figure 1:
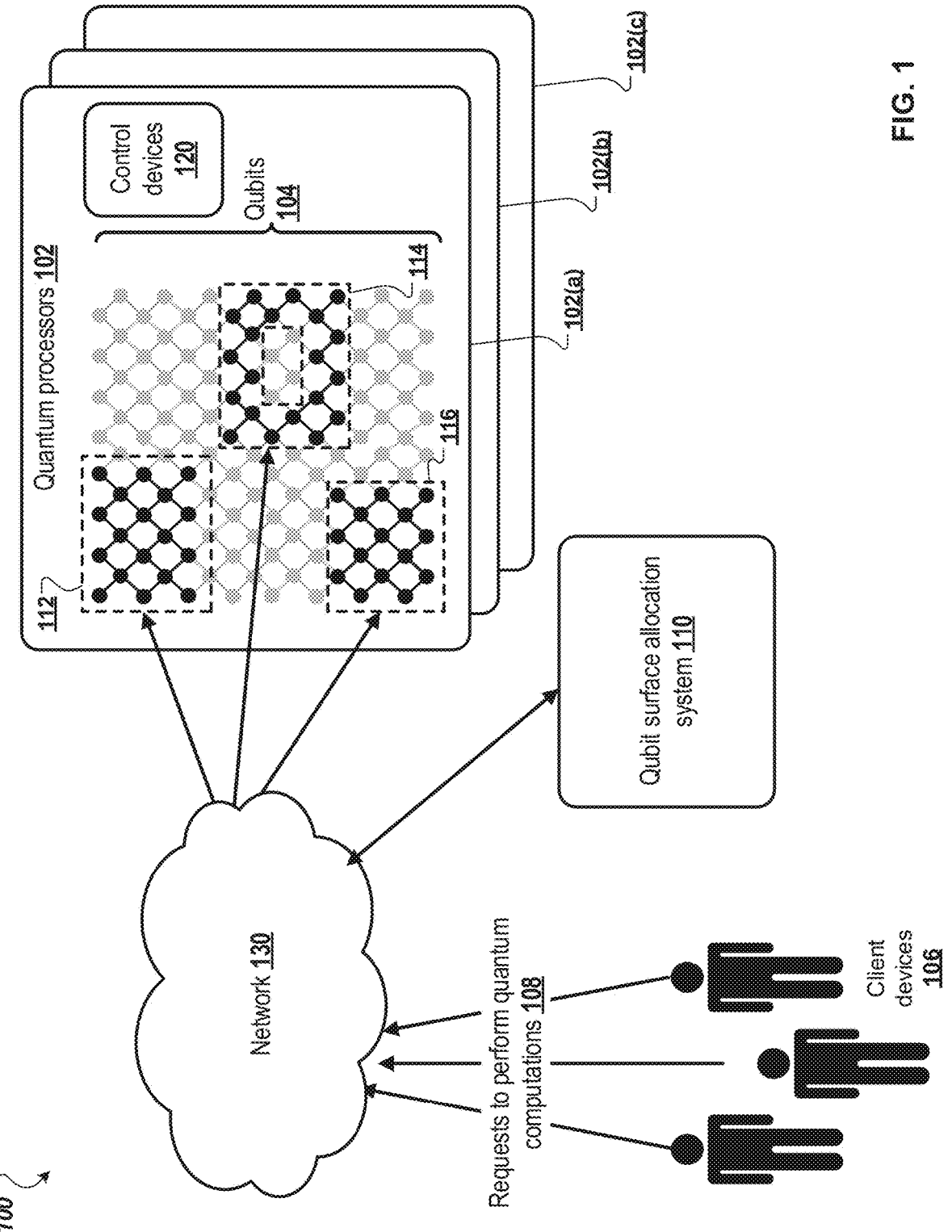
FIG. 1 is a block diagram of an example computing environment.

FIG. 1 is a block diagram of an example computing environment 100 for qubit surface allocation. The example computing environment 100 includes one or more client devices 106, one or more quantum processors 102, and a qubit surface allocation system 110. For clarity, the example computing environment 100 of FIG. 1 includes three quantum processors 102. However, in some implementations the computing environment 100 can include fewer or more quantum processors.

In some implementations, some or all of the components of the example computing environment 100 can be directly connected. In other implementations, as shown in FIG. 1, some or all of the components of the example computing environment 100 can be connected through a network 130, e.g., a local area network (LAN), wide area network (WAN), the Internet, or a combination thereof. In some implementations, the computing environment 100 can be part of a cloud-based quantum computing environment where multiple cloud quantum computing services provide access to respective quantum processors.

The one or more client devices 106 submit requests to perform quantum computations 108 to the qubit surface allocation system 110. The qubit surface allocation system 110 is a classical computing system that can be implemented as classical computer programs on one or more classical computers in one or more locations. As described in more detail below with reference to FIG. 2, the qubit surface allocation system 110 includes a compiler and a quantum processor operating system. These classical computing components can be connected via a network, e.g., a local area network (LAN), wide area network (WLAN), the Internet, or a combination thereof, which can be accessed over a wired and/or a wireless communications link.

Upon receiving the requests, the qubit surface allocation system 110 maps the incoming requests to respective potential qubit surfaces across the one or more quantum processors 102. As part of mapping the requests to particular qubit surfaces, the qubit surface allocation system 110 can compile and transpile the incoming requests into appropriate control instructions for the particular quantum processors associated with the mappings.

For example, in the example shown in FIG. 1, the qubit surface allocation system 110 can receive a first request to perform a quantum computation from a first client device of the one or more client devices 106. Upon receiving the first request, the qubit surface allocation system 110 can allocate the first request to a qubit surface 112 in an array of qubits 104 of a first quantum processor 102(*a*) of the one or more quantum processors 102. The first request is compiled and transpiled into requisite compiled code by which the first quantum processor 102(*a*) is operated.

The qubit surface allocation system 110 can also receive additional requests, such as second and third requests to perform quantum computations from the same or different client devices 106 as the first client device. The qubit surface allocation system 110 can allocate the second and third requests to qubit surface 114 and qubit surface 116, respectively, in the array of qubits 104 of the first quantum processor 102(*a*). Again, each of the second and third request is compiled and transpiled by the qubit surface allocation system 110 to requisite machine code by which the first quantum processor 102(*a*) is operated. Other requests to perform quantum computations can be allocated to other qubit surfaces of the first quantum processor 102(*a*). Alternatively, requests to perform quantum computations can be allocated by the qubit surface allocation system 110 to qubit surfaces of other quantum processors, such as quantum processor 102(*b*) and 102(*c*). In such cases, the requests are compiled and transpiled into the requisite machine code by which the respective processors are operated. Enabling batch access to a quantum processor in this manner improves the utilization of the one or more quantum processors 102.

To perform allocation of quantum computation requests, the qubit surface allocation system 110 can rely on various factors to determine the particular qubit surfaces and quantum processors on which the requested quantum computations are to be performed. For instance, the qubit surface allocation system 110 can base allocation decisions on data describing the current operating status of the quantum processors 102, data relating to recent and scheduled calibration procedures of the quantum processors 102, data representing transpiled quantum circuits that can be used to perform the quantum computations, and data specifying performance targets, among other data. The mapped qubit surfaces identified by the qubit surface allocation system 110 can have various geometries, connectivities, and characteristics. Example qubit surfaces are described below with reference to FIGS. 3A, 3B, and 3C. Example operations performed by the qubit surface allocation system 110 are described below with reference to FIGS. 2 and 4.

The one or more quantum processors 102 can be implemented as quantum computing programs on quantum computing devices. The one or more quantum processors 102 can be located in a single location or in multiple separate locations. Each of the multiple quantum processors 102 includes multiple qubits 104. The qubits 104 included in each processor 102 are physical qubits, e.g., physical devices that behave as a two-state quantum system. Each qubit can be in a respective quantum state that occupies one or more levels. The levels include two computational levels, e.g., levels 0– and 1.

There are multiple different types of quantum processors. The particular type of quantum processor can depend on the type of qubit used. For example, in some implementations the qubits 104 can be superconducting qubits, semiconducting qubits, photonic qubits, or atom-based qubits. For example, the qubits can include Xmon qubits, flux qubits, phase qubits, CAT qubits, or qubits with frequency interactions. Generally, the qubits are prepared, manipulated, and measured by physical devices that are configured to meet basic requirements for quantum computation. For example, the qubits can be initialized, can perform single-qubit rotations, can participate in multi-qubit entangling operations, e.g., CZ, CNOT, and Toffoli gates, can exchange quantum states in a two-qubit SWAP operation, and can be measured by the physical device.

The qubits 104 can be arranged in an array. For example, as shown in FIG. 1, in some implementations the qubits can be arranged as a two-dimensional square grid. The example two-dimensional grid depicted in FIG. 1 includes 8×16=128 qubits, however in some implementations the quantum processors 102 can include a smaller or a larger number of qubits. As another example, in some implementations the qubits can be arranged as a linear array. Regions of the array of qubits, e.g., subsets of qubits included in the array, are referred to herein as qubit surfaces.

In some implementations the qubits 104 can interact and become entangled with each other through nearest neighbor couplings where in a square grid each qubit interacts with at most four neighboring qubits or in a hex grid each qubit interacts with at most three neighboring qubits. The particular type of coupling employed by the quantum processor can depend on the type of qubit being used. For example, for quantum processors that use superconducting qubits, the coupling can be capacitive. As specific examples, the couplers can include a Josephson Junction coupler or another superconducting qubit. In some cases, qubits can couple to one another directly, e.g., without an intervening coupler element between the qubits. Other qubit technologies, such as ion traps, can have different topological constraints on qubit interaction, e.g., are not limited to nearest neighbor interactions.

In some implementations, the quantum processor 102 further include control devices 120 that control the qubits of the processors 102. For example, control devices can tune operating frequencies of the qubits by applying control signals, e.g., voltage pulses, to the qubits through respective control lines. As another example, control devices can control individual frequencies of the qubits such that the frequency of one or more of the qubits are adjusted towards or away from a frequency of an excitation pulse generated by an excitation pulse generator on an excitation driveline. The excitation pulses can include pulses with frequencies that implement quantum operations, e.g., quantum logic gates. In some implementations, the qubits are controlled so as to couple to one achieve quantum entanglement. Control devices can also be used to tune frequencies of coupling devices that couple the multiple qubits. In some cases, control devices can provide a control signal to one or more qubits through capacitive coupling, e.g., realized by a microwave line running adjacent to a qubit capacitor.

The type of control devices used by the quantum processors 102 can vary based on the type of qubits the system uses. As an example, qubits that are realized via atomic, molecular or solid-state quantum systems typically have energy separation of the relevant qubit levels in the microwave or optical domain. The states of such qubits may be manipulated and controlled using external fields, such as microwave or optical fields. In such cases, as an example, mode-locked lasers may serve as control devices due to their broad-band optical spectra that feature both radio frequency and microwave structure. In another example, the control devices can include a collection of individual qubit controllers realized by one or more radio frequency generators. Alternatively or in addition, the control devices can include one or more global excitation controllers realized by one or more radio frequency or microwave generators. In both cases, the control devices can be operated manually or connected to a computer and controlled via suitable software allowing for specifying and automatically running the required qubit operations.

Figure 2:
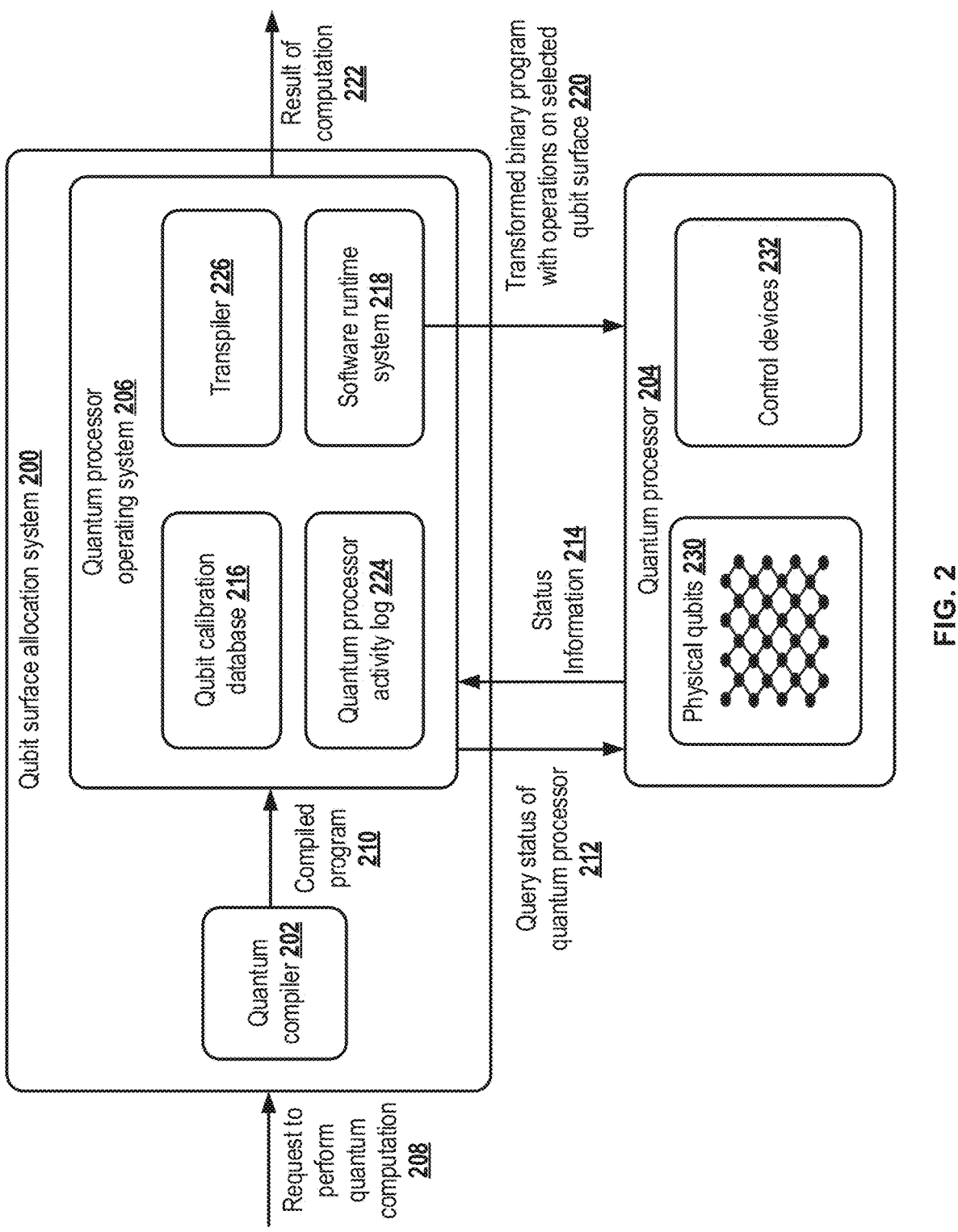
FIG. 2 is a block diagram of an example qubit surface allocation system.

FIG. 2 is a block diagram of an example qubit surface allocation system 200. The example qubit surface allocation system 200 is an example of a system implemented as classical computer programs on one or more classical computers in one or more locations, in which the systems, components, and techniques described herein can be implemented.

The example qubit surface allocation system 200 includes a quantum compiler 202 and a quantum processor operating system 206. The quantum processor operating system 206 in turn includes a qubit calibration database 216, a quantum processor activity log 224, a transpiler 226, and a software runtime system 218. The components of the qubit surface allocation system 200 can be connected via a network, e.g., a local area network (LAN), wide area network (WLAN) such as the Internet, or a combination thereof, which can be accessed over a wired and/or a wireless communications link.

The quantum compiler 202 can be implemented as one or more computer programs, i.e., one or more modules of computer program instructions encoded on a tangible non-transitory storage medium for execution by, or to control the operation of, a data processing apparatus. The computer storage medium can be a machine-readable storage device, a machine-readable storage substrate, a random or serial access memory device, one or more qubits, or a combination of one or more of them. The quantum compiler 202 is configured to receive as input data representing a request to perform a quantum computation, e.g., data 208. The request can be received from a client device, such as client device 106 shown in FIG. 1. In some implementations the data can be encoded as human-readable data, e.g., ASCII or Unicode text. The input data 208 can include information that defines the quantum computation to be performed, e.g., data specifying the type of quantum computation and variables of the quantum computation. For example, the input data received by the quantum compiler 202 can include a request to solve a combinatorial optimization problem. In this example, the input data can include data specifying an objective function to be optimized and optionally one or more problem constraints. As another example, the input data received by the quantum compiler 202 can include a request to perform a quantum simulation. In this example, the input data can include data specifying a Hamiltonian to be simulated.

In some implementations the input data 208 can also include data representing user-specified performance targets for the quantum computation to be performed, e.g., a maximum acceptable computational runtime, a minimum required computational accuracy or an error tolerance threshold, or a maximum acceptable cost. In some implementations the input data 308 can also include data specifying that an error correction code is to be used to perform the quantum computation.

The quantum compiler 202 is configured to process the received input data 208 to identify a qubit configuration required to perform the quantum computation and control and measurement operations to be implemented by the quantum processor 204 when performing the quantum computation. The qubit configuration required to perform the quantum computation can include a required qubit geometry, e.g., a number of qubits required to perform the quantum computation and a required type of qubit connectivity (linear connectivity, planar connectivity, hexagonal connectivity, etc.). The control and measurement operations to be implemented by the quantum processor 204 when performing the quantum computation can include, e.g., control sequences of quantum gates to be applied to the qubits or types and strengths of driving fields to be applied to the qubits, etc.

The quantum compiler 202 is configured to generate a compiled program 210, e.g., a binary program, for the quantum computation using the identified qubit configuration and control and measurement operations. The compiled program 210 can reference qubits included in the qubit configuration by relative grid addresses, e.g., beginning at 0.0. The quantum compiler 202 is configured to provide the compiled program 210 to the quantum processor operating system 206. A quantum computation may include operations to be performed in parallel, with the outputs of those operations to be used as inputs to subsequent operations. The compiled program 210 expresses the full physical parallelism possible for the program, independent of the resource constraints of a particular quantum processor.

The quantum processor operating system 206 can be implemented as one or more computer programs, i.e., one or more modules of computer program instructions encoded on a tangible non-transitory storage medium for execution by, or to control the operation of, a data processing apparatus. The computer storage medium can be a machine-readable storage device, a machine-readable storage substrate, a random or serial access memory device, one or more qubits, or a combination of one or more of them. The quantum processor operating system 206 is configured to receive the compiled program 210. In response to receiving the compiled program 210, the quantum processor operating system 206 is configured to query the current status 212 of the quantum processor 304 to obtain current status information 214 of the quantum processor 204. The status information 214 can include information representing a status of each qubit included in the quantum processor 204. Status information for a qubit can include information that specifies whether the qubit is currently performing a quantum computation, whether the qubit is currently idle, whether the qubit is currently being calibrated, or whether the qubit is out of specification or otherwise not usable.

The quantum processor operating system 206 is configured to read the compiled program 210 to identify the qubit geometry to be used to perform the quantum computation and any user-specified performance targets for the quantum computation. The quantum processor operating system 206 is then configured to use the status information 214 to select a suitable qubit surface to perform the quantum computation.

For example, in some implementations the quantum processor operating system 206 can process the status information 214 to determine whether a region of the physical qubit arrangement 230 that matches the required qubit geometry is currently available for use. In response to determining that such a region is available, the quantum processor operating system 206 can select the region as a qubit surface for the quantum computation.

In some implementations the quantum processor operating system 206 can determine that a region of the physical qubit arrangement 230 matches the required qubit geometry if the region of the physical qubit arrangement 230 is the same as the required qubit geometry, e.g., both are an n×m 2D grid of qubits.

In other some implementations the quantum processor operating system 206 can determine that a region of the physical qubit array matches the required qubit geometry if the region is topologically equivalent or similar to the required qubit geometry. For example, if the required qubit array is a 1D linear array of qubits, but a 2D region of qubits is available, the quantum processor operating system 206 can select the 2D region as a qubit surface for the quantum computation instead, where the coupling between the qubits can be implemented in such a way that the qubits form a (folded) 1D linear array. Topological equivalence or similarity may be evaluated directly by operating system 206 using a suitable topological similarity algorithm, e.g., a matching algorithm, and/or by comparing topology of the required qubit geometry to predetermined data identifying the topology of subsets or combinations of the physical qubits.

In some implementations the quantum processor operating system 206 can be configured to maintain a quantum processor activity log 224 that logs data related to events performed by the quantum processor 204. Example events include quantum computations performed by the quantum processor 204 and calibration routines performed by the quantum processor 204. Data related to events performed by the quantum processor 204 can include a time at which the event began, a time at which the event is expected to end, a time at which an event ended, and hardware required by the event, e.g., qubits, couplers, and control devices required by the event.

In these implementations, if the quantum processor operating system 206 processes the status information 214 and determines that a region of the physical qubit array that matches the required qubit geometry is not available for use, the quantum processor operating system 206 can determine whether to wait for a region of the physical qubit array that matches the required qubit geometry to become available. For example, the quantum processor operating system 206 can access the activity log 224 to determine when additional qubits will become available. The quantum processor operating system 206 can then select a region of the physical qubit arrangement 230 that will (or is predicted to) most quickly become available.

In implementations where the request to perform the quantum computation 208 includes a target runtime for the quantum computation, the quantum processor operating system 206 can use the activity log 224 to determine whether the wait time will cause the quantum computation to exceed the target runtime or not. In response to determining that the wait time will not cause the quantum computation to exceed the target runtime, the quantum processor operating system 206 can select the region of physical qubits as the qubit surface for the computation. In response to determining that the wait time will cause the quantum computation to exceed the target runtime, the quantum processor operating system 206 can implement other techniques to select a qubit surface, as described in more detail below.

In some implementations the quantum processor operating system 206 can include a transpiler 226 that is configured to rewrite a given input quantum circuit to match the constraints and characteristics of a specific qubit surface such that the resulting transpiled quantum circuit is physically realizable using the qubit surface. The transpiled quantum circuit is equivalent to the input quantum circuit, e.g., the unitary evolution underlying the input quantum circuit and the transpiled quantum circuit is the same. To rewrite an input quantum circuit included in a compiled program 210, the transpiler 226 can be configured to map resources and operations, e.g., quantum gates, used in the input quantum circuit, to resources and operations, e.g., quantum gates, that can be implemented using the qubit surface. For example, if the input quantum circuit uses two-qubit gates that cannot be physically realized by the qubit surface, e.g., the qubits to which the two-qubit gates are applied are not connected in the qubit surface, the transpiler 226 can add SWAP operations to the input quantum circuit to move the qubit states from qubit to qubit until they are adjacent on the qubit surface.

The transpiler 226 can also be configured to optimize transpiled quantum circuits. For example, the addition of control operations, e.g., swap gates, to an input quantum circuit increases the depth and gate count of the input quantum circuit. Therefore, the transpiler can be configured to implement one or more optimization routines to optimize the transpiled quantum circuit, e.g., by combining or eliminating control operations where appropriate.

In these implementations, if the quantum processor operating system 206 processes the status information 214 and determines that a region of the physical qubit array that matches the required qubit geometry is not available for use, the quantum processor operating system 206 can select an available region of the physical qubit array, e.g., a region that most closely resembles the required qubit geometry, as the qubit surface for the quantum computation and use the transpiler 226 to rewrite (and optimize) the control operations included in the binary program to match the constraints and characteristics of the available region.

In implementations where the request to perform the quantum computation 208 includes performance targets for the quantum computation, the quantum processor operating system 206 can determine whether execution of the transpiled binary program will meet the performance targets before finalizing the selection of the qubit surface. For example, since the transpiled control operations may include additional control operations, the runtime and costs associated with performing the quantum computation may increase. Similarly, the likelihood of errors occurring during the quantum computation may increase due to the increase in circuit depth. Therefore, quantum processor operating system 206 can compare a predicted runtime, cost, and likelihood of errors associated with the transpiled control operations to the user specified performance targets and select the available region of the physical qubit array as the qubit surface for the computation if the predicted runtime, cost, and likelihood of errors associated with the transpiled control operations meet the user specified performance targets. If the predicted runtime, cost, and likelihood of errors associated with the transpiled control operations do not meet the user specified performance targets, the quantum processor operating system 206 can select a different available region of the physical qubit array and repeat the above described process to determine whether this region is a more suitable region.

Figure 3A:
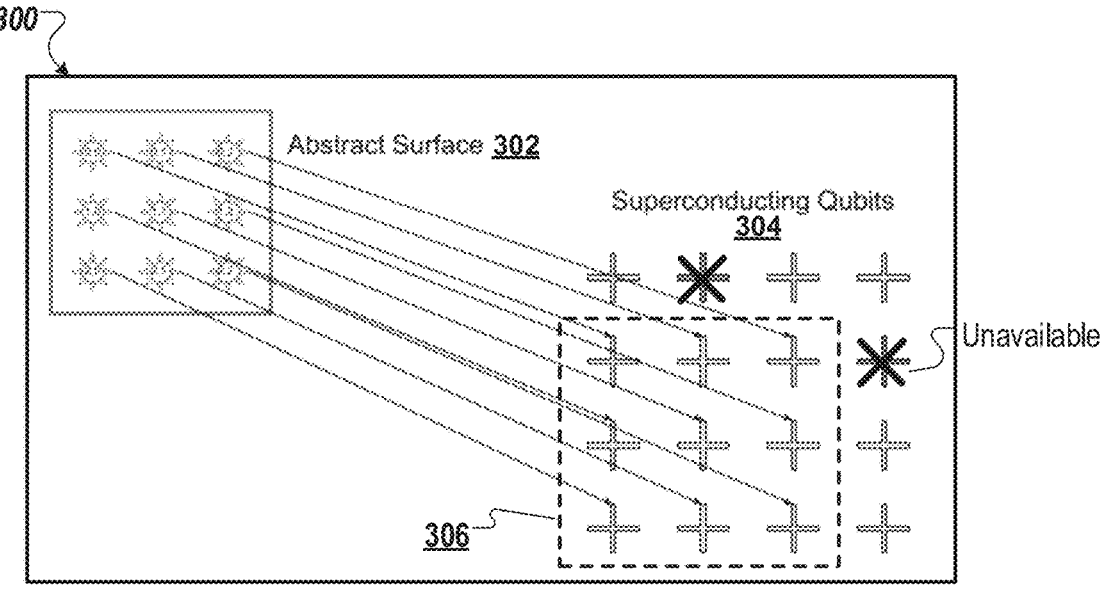
FIGS. 3A-3C show example qubit surface mappings to physical qubit arrays on quantum processors.
Figure 3A:
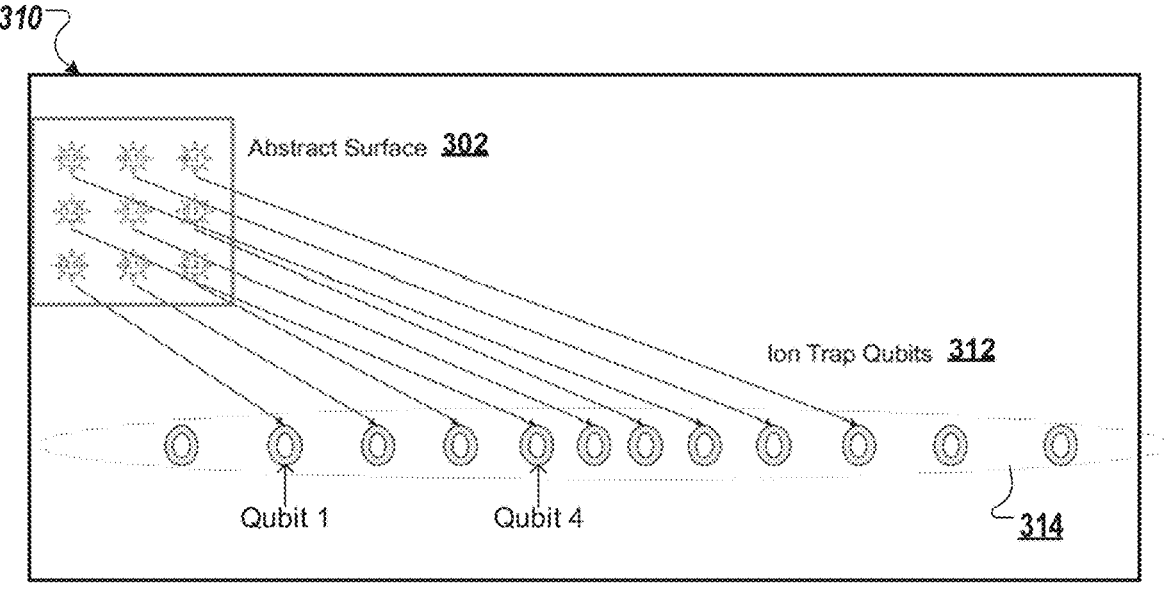
Figure 3B:
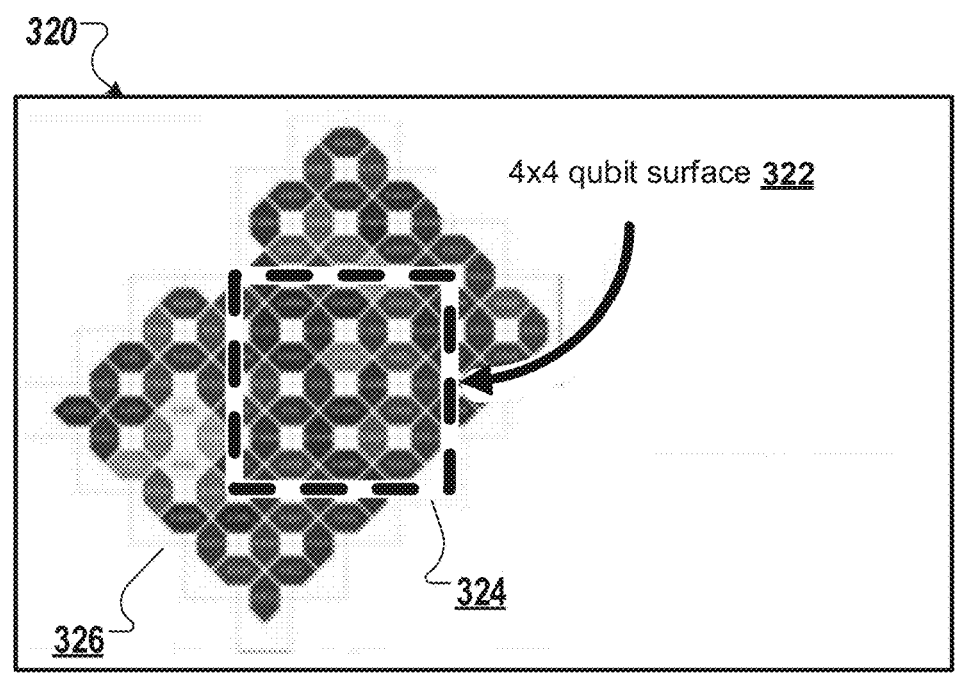
Figure 3B:
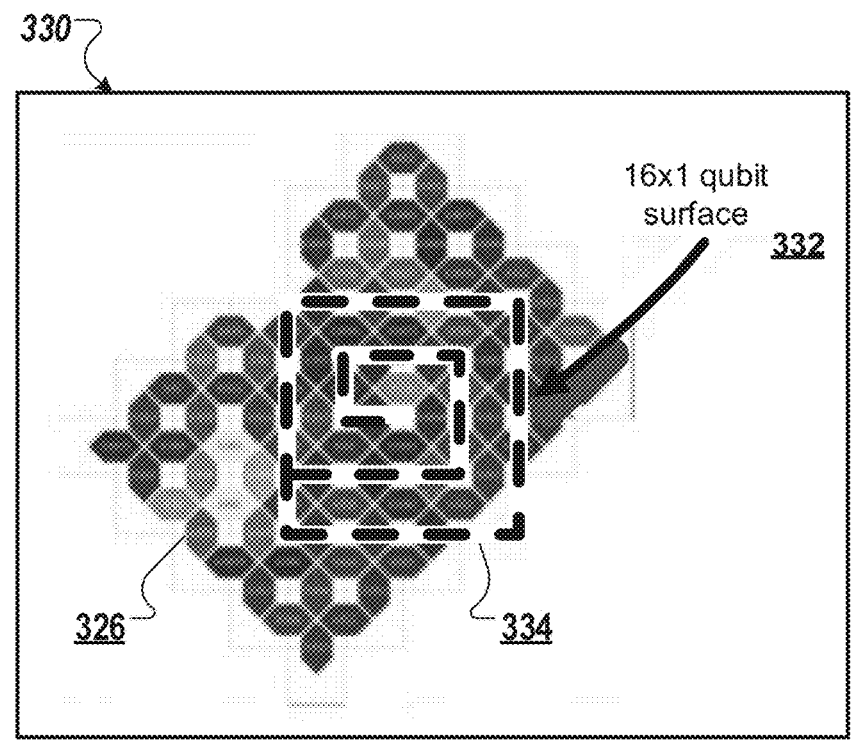
Figure 3C:
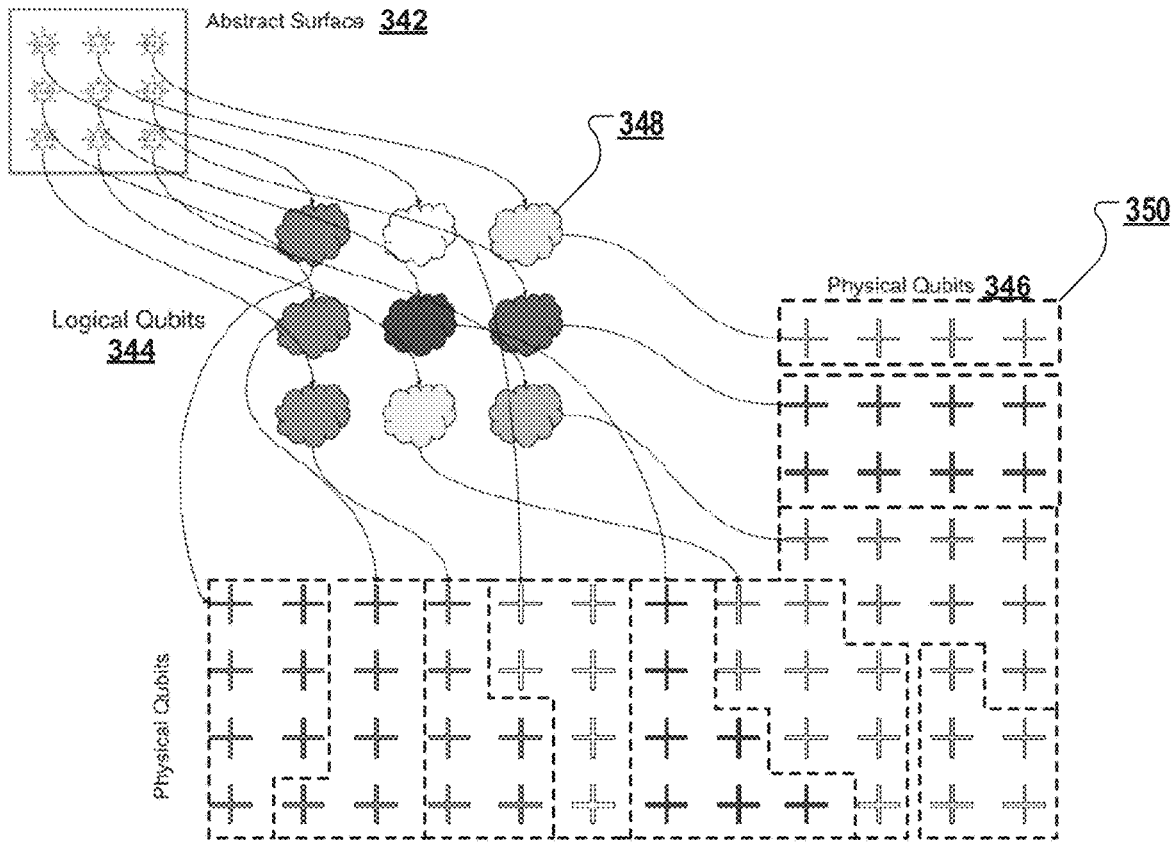

In implementations where the request to perform a quantum computation 208 specifies that an error correction code is to be used to perform the quantum computation, the qubit geometry required to perform the quantum computation can include multiple logical qubits, where each logical qubit includes multiple physical qubits (see, e.g., FIG. 3C). In these implementations, if the quantum processor operating system 206 processes the status information 214 and determines that a region of the physical qubit array that matches the required qubit geometry is not available for use, the quantum processor operating system 206 can select multiple available regions of the physical qubit array, e.g., multiple regions that most closely resemble the size and geometry of one or more logical qubits, as the qubit surface for the quantum computation. The quantum processor operating system 206 can then use the transpiler 226 to rewrite (and optimize) the control operations included in the binary program to match the constraints and characteristics of the available region. In this example, the transpiled control operations can include additional lattice surgery techniques that move the states of logical qubits through the physical qubit array such that logical qubits can interact with one another and implement multi-qubit logical operations, e.g., enable state distillation between disjoint pluralities of physical qubits of different size.

As described above, since the transpiled control operations may include additional control operations, the runtime and costs associated with performing the quantum computation may increase (although using the error correcting code, the likelihood of errors should remain stable). Therefore, the quantum processor operating system 206 can compare a predicted runtime or cost associated with the transpiled control operations to the user specified performance targets and select available regions of the physical qubit array as the qubit surface for the computation if the predicted runtime or cost associated with the transpiled control operations meet the user specified performance targets.

In some implementations the quantum processor operating system 206 can include a qubit calibration database 216 that stores calibration data for the qubits included in the physical qubit arrangement 230. The calibration data can include a record of calibration procedures performed on each qubit, e.g., information specifying when a qubit was last calibrated, data indicating upcoming scheduled calibration procedures, e.g., information specifying when a qubit is due to be re-calibrated, properties of each qubit such as average timeouts or decay times, and data indicating whether each qubit is historically reliable or not.

In these implementations the quantum processor operating system 206 can use the calibration data stored in the qubit calibration database to select an available region of qubits as a qubit surface for the quantum computation. For example, if the quantum processor operating system 206 implements any of the above described techniques and identifies multiple candidate regions of the physical qubit arrangement 230, the quantum processor operating system 206 can then use the calibration data stored in the calibration data database 216 to select a most reliable region of qubits from the multiple candidate regions as the qubit surface. For example, the quantum processor operating system 206 can select a region of qubits that have most recently been calibrated as the qubit surface, since qubits that have recently been calibrated are more likely to reliably perform quantum computations, e.g., compared to qubits that are due to be calibrated.

Alternatively or in addition, the quantum processor operating system 206 can use historical data to select a region of qubits that have proven to be more reliable than other qubits, e.g., have a higher quality than other qubits.

Alternatively or in addition, the quantum processor operating system 206 can use data that specifies average timeouts or decay times of the qubits to select a region of qubits, e.g., so that qubits with an average timeout or decay time that is less than the estimated runtime of the quantum computation are avoided. In these examples, the quantum processor operating system 206 can also determine whether to move the partially computed state of a qubit surface to a different qubit surface (that will have recently been calibrated) during the quantum computation in order to avoid qubit decay or time out, e.g., if the additional operations associated with moving the qubit surface do not cause the quantum computation to exceed user specified performance targets.

The quantum processor operating system 206 can be configured to apply a combination of one or more of the above described techniques to select a suitable qubit surface to perform the quantum computation specified by the input data 208.

In some implementations the quantum processor operating system 206 can be configured to execute multiple quantum computations in parallel on different qubit surfaces in the physical qubit arrangement 230. For example, to reduce computational runtime for a quantum computation, the quantum processor operating system 206 can execute multiple copies of the binary program for the quantum computation on different qubit surfaces in the physical qubit arrangement 230. The results of each execution can be used to determine a probabilistic result of the quantum computation. As another example, the quantum processor operating system 206 can be configured to receive multiple binary programs from the quantum compiler 202, where each binary program corresponds to a respective request to perform a respective quantum computation. The quantum processor operating system 206 can then select a qubit surface for each of the multiple binary programs such that the quantum processor 204 performs multiple quantum computations at the same time. In some implementations the quantum processor operating system 206 can execute received binary programs on a first come first serve basis. In other implementations the quantum processor operating system 206 can batch incoming requests and execute the binary programs in an order that optimizes the utilization of the quantum processor 204.

In these implementations, the quantum processor operating system 206 can be configured to select the multiple qubit surfaces such that noise and interference effects do not take an executing qubit surface out of specification. For example, the quantum processor operating system 206 can maintain minimum distances between each selected qubit surface.

For clarity, example system 200 includes one quantum processor 204 which, in turns, includes one physical qubit arrangement 230. However, in some implementations the system can include or have access to multiple physical qubit arrays or multiple quantum processors. In these implementations the quantum processor operating system 206 can apply the above described techniques to select suitable qubit surfaces from amongst the multiple physical qubit arrays or multiple quantum processors.

In some implementations the quantum processor operating system 206 can improve the efficiency of the allocation and scheduling of qubit surfaces by pre-organizing qubit resources corresponding to frequently used qubit surfaces. For example, the quantum processor operating system 206 can pre-organize regions of the physical qubit arrangement 230 with different sizes and geometries in an allocation cache. Then, when a program requests a particular surface or geometry, if a preconfigured region is available, it can be acquired as a region without the overhead of searching for a region of the desired size.

In some implementations, as shown in FIG. 2, when the quantum processor operating system 206 identifies a suitable qubit surface for the quantum computation, the quantum processor operating system 206 uses a software runtime system 218 to transform the compiled program 210 for the quantum computation. In some implementations, the quantum processor operating system 206 can transform the compiled program 210 by replacing relative qubit grid addresses included in the binary program with addresses of qubits in the suitable qubit surface. For example, the relative grid address 0,0 included in the compiled program 210 can be mapped to an origin qubit in the suitable qubit surface (e.g., starting at N,M). This can be achieved by adding values N and M to the 0-based coordinate values in the binary program to determine which qubits will actually be selected. For more complex qubit surfaces, each qubit in the suitable qubit surface can be mapped to a respective grid address included in the compiled program 210. The software runtime system 218 can also transform the compiled program 210 for the quantum computation to incorporate any additional control operations or qubits determined by the transpiler 226. The quantum processor operating system 206 can then provide the transformed program to the quantum processor 204 for execution.

In other implementations, the transformation of the binary program can occur as the binary program is executed by the quantum processor 204. That is, control logic of the quantum processor 204 can perform the transformation during runtime. In a classical environment, software (firmware or microcode) can decode the instruction and map the operations to the correct actual physical resources or hardware can decode the instructions and transform them to an internal format that is larger and more implementation-specific than the abstracted binary instruction. For example, a RISC instruction ADD R1,R2,R3 may only have 5 bits to specify registers 1, 2, and 3, so that the ARCHITECTURAL choice is between 32 possible registers, but the actual hardware may have more registers, and the physical registers assigned to R1, R2, and R3 may be register numbers 5, 47, and 216—the internal representations of the registers would expand to cover the physical range. By analogy, the control software, firmware, and hardware control systems of the quantum processor 204 can modify and extend the information in the quantum binary description of operations as they flow through the hardware—but this does not mean modifying the binary program image in storage.

After the transformed binary program 220 has been executed, the quantum processor 204 can provide results of the computation to the quantum processor operating system 206, and, in turn, the quantum processor operating system 206 can provide the results of the quantum computation 222 as output, e.g., return results of the quantum computation to the requesting user.

FIGS. 3A-3C show example qubit surface mappings to physical qubit arrays on quantum processors. FIG. 3A shows example mappings from a 2D qubit surface to a 2D physical qubit array and a linear physical qubit array. In the example mapping 300, the qubit surface 302 is a N×M Cartesian grid of qubits addressed from 0,0 to (N−1), (M−1) in X/Y coordinates, where in this non-limiting example N=3 and M=3. The qubit surface 302 is mapped to a grid of qubits 304, e.g., superconducting qubits. In this example, the qubit surface 302 is mapped to a portion 306 of the grid of qubits 304 with a same structure as the qubit surface 302, i.e., a N×M Cartesian grid of qubits. In other words, the topological mapping between the qubit surface 302 and the physical qubit array is a direct mapping.

In the example mapping 310 shown in FIG. 3A, the same qubit surface 302 is mapped to a linear array of qubits 312, e.g., ion trap qubits. In this example, the qubit surface 302 is mapped to an array of physical qubits with a different structure. This can be made possible if the quantum computing device that includes the physical qubits allows for multi-qubit operations on non-neighboring qubits. For example, in the example qubit surface 302 the qubit with address 2,0 is mapped to qubit 1 in the linear array 312 and the qubit with address 1,0 is mapped to qubit 4 in the linear array 312. The qubit with address 2,0 has a nearest neighbor coupling with the qubit with address 1,0 in the qubit surface 302, therefore this mapping is valid if the quantum computing device allows for multi-qubit operations on non-neighboring qubits 1 and 4.

FIG. 3B shows additional example mappings from a 2D qubit surface to a 2D physical qubit array. In the example mapping 320, the qubit surface 322 is a 4×4 Cartesian grid of qubits. The qubit surface 322 is directly mapped to a portion 324 of a grid of qubits 326, e.g., a 2D Cartesian mesh superconducting qubits in a superconducting quantum processor chip. In the example mapping 330, the qubit surface 332 is a 16×1 linear array of qubits. The qubit surface 332 is indirectly mapped to a portion 334 of the grid of qubits 326 (to a spiral of qubits in the grid).

FIG. 3C shows an example mapping 340 from a 2D qubit surface 342 to a surface of logical qubits 344. Each logical qubit is mapped to a collection of physical qubits 346 in a 2D qubit array. For example, logical qubit 348 (which corresponds to qubit 0,2) is mapped to collection 350 of physical qubits. In the example shown in FIG. 3C, the logical qubits are mapped to a few physical qubits, e.g., between 4 and 8. However, this is for illustrative purposed only and the number of physical qubits can vary. For example, in some implementations the number of physical qubits to logical qubits can be significantly larger, e.g., on the order of 1000:1. The binding of logical qubits to physical qubits need not be static. In some implementations control systems of the quantum processor can set up and change bindings as necessary, given the requirements of the program and the constraints of the hardware. The algorithm and quantum application program do not require knowledge of what sorts of error correction techniques, such as lattice surgery, are employed to provide the specified level of performance and quality.

FIG. 4 is a flow diagram of an example process 400 for allocating a qubit surface to a quantum computation. For convenience, the process 400 will be described as being performed by a qubit surface allocation system. For example, the qubit surface allocation system 200 of FIG. 2, appropriately programmed in accordance with this specification, can perform the process 400.

The system receives a request to perform a quantum computation (step 402). The system compiles the request to obtain a program, e.g., binary program, for the quantum computation (step 404). The program specifies an abstract qubit surface (also referred to herein as a first qubit surface) required to perform the quantum computation. The first qubit surface has a geometry that specifies a number of qubits required to perform the quantum computation and a type of qubit connectivity required to perform the quantum computation.

The system maps, based on a quantum processor type and an operational state of an available quantum processor, the first qubit surface to a plurality of physical qubits included in the available quantum processor to obtain a mapped qubit surface (step 406). In some implementations, to map the first qubit surface to the plurality of physical qubits, the system queries an operational state of at least one of one or more quantum processors, where each quantum processor in the one or more quantum processors has a respective quantum processor type, and selects the available quantum processor from the one or more quantum processors based on the operational state of the at least one quantum processor.

An operational state of a quantum processor indicates one or more of: whether qubits included in the quantum processor are currently performing a quantum computation or not, whether qubits included in the quantum processor are currently idle, whether qubits included in the quantum processor are currently being calibrated, or whether the qubits are out of specification or otherwise not usable. Different quantum processor types include ion trap processors, superconducting processors, photonic processors, neutral atom processors, and quantum annealers.

In some implementations mapping the first qubit surface to the plurality of physical qubits included in the available quantum processor to obtain the mapped qubit surface includes selecting a plurality of physical qubits included in the available quantum processor with a geometry that matches a geometry of the first qubit surface.

In some implementations mapping the qubit surface to the plurality of physical qubits included in the available quantum processor to obtain the mapped qubit surface includes selecting multiple physical qubits in the available quantum processor so that the selected multiple physical qubits have a geometry that is topologically equivalent to a geometry of the first qubit surface In some implementations mapping the qubit surface to the plurality of physical qubits included in the available quantum processor to obtain the mapped qubit surface includes selecting an available set of qubits included in the quantum processor, where the available set of qubits includes a geometry that is different to a geometry of the first qubit surface, and adjusting control operations included in the program to match constraints and characteristics of the available set of qubits.

In some implementations the request to perform a quantum computation specifies one or more performance targets, the performance targets including a maximum acceptable computational runtime, a minimum required computational accuracy or an error tolerance threshold, or a maximum acceptable cost. In these implementations mapping the first qubit surface to the plurality of physical qubits included in the available quantum processor to obtain the mapped qubit surface can include selecting a set of physical qubits included in the available quantum processor that, when used to perform the quantum computation, meet the one or more performance targets.

In some implementations the first qubit surface includes (or specifies) multiple logical qubits and the mapped qubit surface includes multiple pluralities of physical qubits, each plurality of the multiple pluralities corresponding to a respective logical qubit. The multiple pluralities of physical qubits can include disjoint pluralities of physical qubits. In these implementations the transformed program described below can include lattice surgery operations that enable interactions, e.g., enable state distillation between disjoint pluralities of physical qubits of different size, between the disjoint pluralities of physical qubits.

The system transforms the program to obtain a transformed program by replacing quantum computing operations on the first qubit surface to quantum computing operations on the mapped qubit surface (step 408). In some implementations generating the transformed program includes replacing relative qubit grid addresses in the program with addresses of qubits in the mapped qubit surface, e.g., by mapping an origin qubit in the mapped qubit surface to a qubit in the qubit surface with a relative grid address 0,0.

The system provides the transformed program to the available quantum processor to perform the quantum computation using the plurality of physical qubits in the mapped qubit surface (step 410).

In some implementations, the quantum processor operating system can perform step 408 prior to step 410. That is, the quantum processor operating system can transform the program by replacing quantum computing operations on the first qubit surface to quantum computing operations on the mapped qubit surface before the available quantum processor begins execution of the program, e.g., as part of a program loader process. In other implementations, control logic of the available quantum processor itself can perform step 408, e.g., based on parameters loaded into hardware by the operating system. That is, the program can be transformed at run-time by control hardware of the available quantum processor, e.g., based on its configuration by the operating system.

Implementations and all of the classical computing functional operations described in this specification may be implemented in digital electronic circuitry, or in computer software, firmware, or hardware, including the structures disclosed in this specification and their structural equivalents, or in combinations of one or more of them. Implementations may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations have been described. Other implementations are within the scope of the following claims. For example, the actions recited in the claims may be performed in a different order and still achieve desirable results.

What is claimed is:

1. A computer-implemented method comprising:
receiving a request to perform a quantum computation;
compiling the request to obtain a program for the quantum computation, wherein the program specifies a first qubit surface required to perform the quantum computation and quantum computational operations required to perform the quantum computation in terms of the first qubit surface;
mapping, based on a quantum processor type and an operational state of an available quantum processor, the first qubit surface to a plurality of physical qubits included in the available quantum processor to obtain a mapped qubit surface;
transforming the program to generate a transformed program, wherein transforming the program comprises replacing quantum computing operations on the first qubit surface with quantum computing operations on the mapped qubit surface; and
providing the transformed program to the available quantum processor to perform the quantum computation using the plurality of physical qubits in the mapped qubit surface.

2. The method of claim 1, wherein the first qubit surface comprises a geometry that specifies a number of qubits required to perform the quantum computation and a type of qubit connectivity required to perform the quantum computation.

3. The method of claim 1, wherein mapping the first qubit surface to a plurality of physical qubits included in the available quantum processor to obtain the mapped qubit surface comprises:
querying an operational state of at least one quantum processor of one or more quantum processors, wherein each quantum processor in the one or more quantum processors has a respective quantum processor type; and
selecting, based on the operational state of the at least one quantum processor, the available quantum processor from the one or more quantum processors.

4. The method of claim 1, wherein the operational state of the available quantum processor indicates one or more of: whether qubits included in the quantum processor are currently performing a quantum computation, whether qubits included in the quantum processor are currently idle, whether qubits included in the quantum processor are currently being calibrated, and whether the qubits are out of specification or otherwise not usable.

5. The method of claim 1, wherein the quantum processor type comprises an ion trap processor, a superconducting processor, a photonic processor, or a neutral atom processor.

6. The method of claim 1, wherein mapping the first qubit surface to the plurality of physical qubits included in the available quantum processor to obtain the mapped qubit surface comprises selecting a plurality of physical qubits included in the available quantum processor with a geometry that matches a geometry of the first qubit surface.

7. The method of claim 1, wherein mapping the first qubit surface to the plurality of physical qubits included in the available quantum processor to obtain the mapped qubit surface comprises selecting multiple physical qubits in the available quantum processor so that the selected multiple physical qubits have a geometry that is topologically equivalent to a geometry of the first qubit surface.

8. The method of claim 1, wherein mapping the first qubit surface to the plurality of physical qubits included in the available quantum processor to obtain the mapped qubit surface comprises:
selecting an available set of qubits included in the quantum processor; and
adjusting control operations included in the program to match constraints and characteristics of the available plurality of qubits.

9. The method of claim 1, wherein
the request to perform a quantum computation specifies one or more performance targets, the performance targets comprising a maximum acceptable computational runtime, a minimum required computational accuracy or error tolerance threshold, or a maximum acceptable cost; and
wherein mapping the qubit surface to the plurality of physical qubits included in the available quantum processor to obtain the mapped qubit surface comprises selecting a set of physical qubits included in the available quantum processor that, when used to perform the quantum computation, meet the one or more performance targets.

10. The method of claim 1, wherein
the first qubit surface specifies multiple logical qubits; and the mapped qubit surface comprises multiple pluralities of physical qubits, each plurality of the multiple pluralities corresponding to a respective logical qubit of the first qubit surface.

11. The method of claim 10, wherein the multiple pluralities of physical qubits comprise disjoint pluralities of physical qubits, and wherein the transformed program comprises lattice surgery operations that enable interactions between the disjoint pluralities of physical qubits.

12. The method of claim 1, wherein generating the transformed program comprises replacing relative qubit grid addresses in the program with addresses of qubits in the mapped qubit surface.

13. The method of claim 12, wherein replacing relative qubit grid addresses in the program with addresses of qubits in the mapped qubit surface comprises mapping an origin qubit in the mapped qubit surface to a qubit in the qubit surface with a relative grid address 0,0.

14. A system comprising:
one or more data processing apparatuses; and
non-transitory computer readable storage media in data communication with the one or more data processing apparatuses and storing instructions that, when executed by the data processing apparatuses, cause the one or more data processing apparatuses to perform operations comprising:
receiving a request to perform a quantum computation;
compile the request to obtain a program for the quantum computation, wherein the program specifies a first qubit surface required to perform the quantum computation and quantum computational operations required to perform the quantum computation in terms of the first qubit surface;
mapping, based on a quantum processor type and an operational state of an available quantum processor, the first qubit surface to a plurality of physical qubits included in the available quantum processor to obtain a mapped qubit surface;
transforming the program to generate a transformed program, wherein transforming the program comprises replacing quantum computing operations on the first qubit surface with quantum computing operations on the mapped qubit surface; and
providing the transformed program to the available quantum processor for execution.

15. The system of claim 14, further comprising the available quantum processor, and wherein the operations further comprise executing the transformed program using the available quantum processor to perform the quantum computation using the plurality of physical qubits in the mapped qubit surface.

16. A non-transitory computer-readable storage medium comprising instructions stored thereon that are executable by a processing device and upon such execution cause the processing device to perform operations comprising:
receiving a request to perform a quantum computation;
compiling the request to obtain a program for the quantum computation, wherein the program specifies a first qubit surface required to perform the quantum computation and quantum computational operations required to perform the quantum computation in terms of the first qubit surface;

mapping, based on a quantum processor type and an operational state of an available quantum processor, the first qubit surface to a plurality of physical qubits included in the available quantum processor to obtain a mapped qubit surface;
transforming the program to generate a transformed program, wherein transforming the program comprises replacing quantum computing operations on the first qubit surface with quantum computing operations on the mapped qubit surface; and
providing the transformed program to the available quantum processor for execution.

17. A system comprising:
a compiler configured to:
receive a request to perform a quantum computation, and
compile the request to obtain a program for the quantum computation, wherein the program specifies a first qubit surface required to perform the quantum computation and quantum computational operations required to perform the quantum computation in terms of the first qubit surface;
a quantum processor operating system configured to:
map, based on a quantum processor type and an operational state of an available quantum processor, the first qubit surface to a plurality of physical qubits included in the available quantum processor to obtain a mapped qubit surface,
transform the program to generate a transformed program, wherein transforming the program comprises replacing quantum computing operations on the first qubit surface with quantum computing operations on the mapped qubit surface, and
provide the transformed program to the available quantum processor for execution.

18. The system of claim 17, further comprising a quantum processor configured to execute the transformed program to perform the quantum computation using the plurality of physical qubits in the mapped qubit surface.

19. The system of claim 17, wherein the quantum processor operating system comprises:
a qubit calibration database configured to store calibration data for the physical qubits included in multiple quantum processors, wherein the multiple quantum processors comprise the available quantum processor;
a quantum processor activity log configured to log data related to events performed by the multiple quantum processors, the events comprising quantum computations performed by the multiple quantum processors and calibration routines performed by the multiple quantum processors;
a software runtime system configured to transform the program; and
a transpiler configured to rewrite and optimize input quantum circuits to match constraints and characteristics of respective qubit surfaces.

20. The system of claim 19, wherein the multiple quantum processors comprise cloud computing resources.

* * * * *